United States Patent [19]
Clarke

[11] 3,798,350
[45] Mar. 19, 1974

[54] CO-AXIAL CABLE WITH STRENGTH MEMBER
[75] Inventor: Eric Fifield Stuart Clarke, Harrow, England
[73] Assignee: The Post Office, London, England
[22] Filed: Jan. 22, 1973
[21] Appl. No.: 325,450

[30] Foreign Application Priority Data
Jan. 28, 1972   Great Britain ..................... 4232/72

[52] U.S. Cl. .......... 174/102 R, 174/107, 174/131 R, 57/145
[51] Int. Cl. ............................................. H01b 7/18
[58] Field of Search ............ 174/102 R, 107, 130 R, 174/131 R, 131 A, 131 B, 115

[56] References Cited
UNITED STATES PATENTS
2,953,627   9/1960   Malneritch ...................... 174/102 R
3,549,788   12/1970  Apen ................................. 174/107

Primary Examiner—E. A. Goldberg
Attorney, Agent, or Firm—Hall & Houghton

[57] ABSTRACT
A telecommunication submarine cable of co-axial construction has a multistrand centre core imparting tensile strength to the cable, the core having adjacent layers of the core separated by a layer of soft metal.

9 Claims, 4 Drawing Figures

PATENTED MAR 19 1974  3,798,350

CO-AXIAL CABLE WITH STRENGTH MEMBER

This invention relates to strength members for stranded wire ropes or hawsers and for telecommunications cables, and more especially submarine cables of the co-axial, light weight or armourless type. The tensile strength of a light weight cable is derived from a strength member located co-axially within the inner conductor of the cable. The strength member can be formed from two or more layers of helically-wound high tensile steel wires, adjacent layers having lays of opposite hands so that the strength member is torsionally-balanced. In the case however, where the steel wires are cylindrical then wires of adjacent layers make only point contact where they cross and if the strength member is subjected to radial stress (as is the case when, for example, cables are being jointed by swaging) then some of the wires of one layer may be nicked by the wires of adjacent layers and the strength member will be weakened.

This can be overcome by, in the case of the two-layer construction, swaging the inner one of the layers so that it presents a near-cylindrical surface, but this has the disadvantage that the swaging dies must be well lubricated and a fluid lubricant is normally used with the result that in practice fluid lubricant becomes trapped between the wires. This can be disadvantageous, for example during subsequent stages of submarine cable manufacture the lubricant can seep between the outer layer of wires and the inner surface of the inner conductor and so permit slipping to take place between the conductor and the wires when the cable is gripped externally and is under tension.

The present invention provides a strength member including at least two layers of helically-wound wire which provide the strength of the member and which have opposing lays whereby the strength member is torsionally-balanced, and at least one layer of a comparatively soft metal interposed between the two layers of helically-wound wire.

The interposed layer or layers may be a layer or layers of aluminum, copper or mild steel or a combination thereof. The or each layer may be formed by a plurality of helically-wound wires which may be cylindrical, or which may have a key stone-shaped cross-section. Alternatively, the or each layer may be formed by a helically-wound tape, or at least one tape running lengthwise of the cable.

In the case of a strength member for a co-axial light weight cable used in conjunction with submerged repeaters requiring power to be fed over the cable, it is preferable that the metal shall be of high electrical conductivity.

By way of example, a telecommunications cable including a strength member constructed in accordance with the invention will be described with reference to the accompanying drawing of which:

Figure 1:
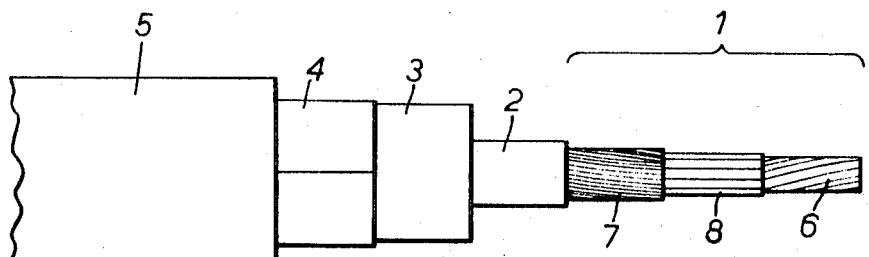
FIG. 1 shows part of the cable cut away to reveal its constituent parts.

The cable shown in the drawing is a submarine cable of the light weight, or armourless type. The cable has a composite strength member 1 contained within the inner conductor 2 which is spaced by a dielectric 3 from the outer conductor 4, and an outer protective coat 5. These components, apart from the strength member 1, are conventional and need not be described further: it will be appreciated, however, that the form shown in the drawing is not essential and that the conventional components of the cable could be modified in any appropriate manner.

The strength member 1 is provided to enable the cable to withstand forces such as those applied during cable laying and recovery. The strength of the member 1 is derived from a centre strand 6 of helically-wound wires, and an outer layer 7 also of helically-wound wires, of any suitable metal having the requisite tensile strength, for example high-tensile steel. The strand 6 and the layer 7 have opposed lays so that the strength member 1 is torsionally-balanced and between the layers is interposed a layer 8 of much lighter and much softer conductive material, for example aluminium.

Figure 2:
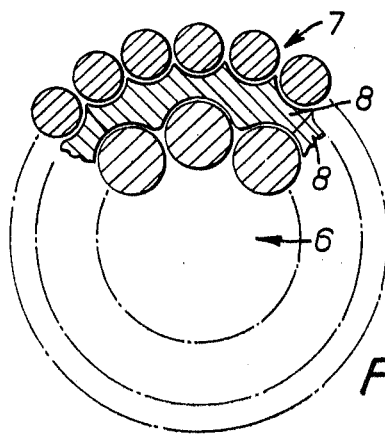
FIGS. 2, 3 and 4 are cross-sections on an enlarged scale showing part of the strength member, the component parts being shown slightly separated for purposes of clarity.
Figure 3:
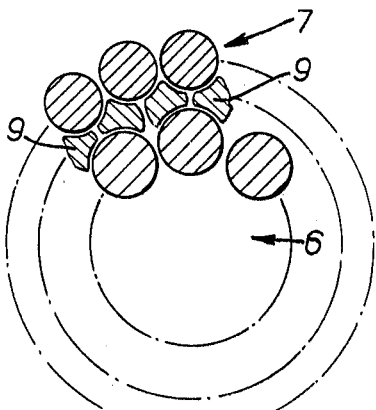
Figure 4:
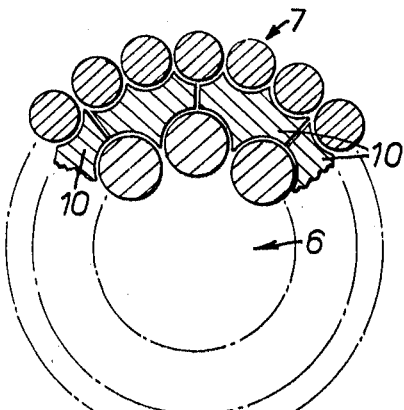

The interposed layer 8 is shown in FIGS. 1 and 2 as being formed by a plurality of tapes running lengthwise of the cable, but it will be appreciated that it could be formed by a single tape only which could run lengthwise of the cable or be wound helically around the strand 6. Alternatively, the layer 8 could be formed by a plurality of helically-wound wires 9, FIG. 3: these wires may, for example, be cylindrical, or as shown at 10, FIG. 4 they may have a keystone-shaped cross-section so that they provide a cylindrical bed for the outer wire layer 7.

The cable is constructed by the now well known methods of building co-axial cables, the layer 8 being introduced at the appropriate stage in the construction by feeding into the tapes or wires and then compacting them on to the strand 6 if necessary.

The wires or tapes may be compacted on to the strand by rollers or other means not requiring the use of a fluid lubricant. The compaction may be carried out before or after the application of the outer layers or layer of steel wires. It may also be carried out at the same time as the inner conductor is compacted on to the completed strand. However, an advantageous feature of the use of the interposed layer 8 is that a compacting process is usually unnecessary since the layer 8, being soft, will naturally bed on to the strand 6 while the outer wire layer 7 will naturally bed on to the layer 8. This will, of course, result in the layer 8 being nicked but this is unimportant since the layer does not impart strength to the strength member 1.

A further advantage of the interposed layer 8 is that it enables a strength member 1 of given cross-section to be provided, which will not impart so much weight to the cable as a similarly-dimensioned strength member formed completely of steel. It may, for example, be necessary to provide a strength member/inner conductor assembly of particular dimensions in order to minimize the transmission loss of a cable and to achieve optimum impedance, and in larger cables this may mean that the strength member (if formed completely of steel) would provide greater strength than is required and would add considerably to the weight of the cable: the interposed layer 8 enables a weight reduction to be achieved without lowering the tensile strength of the cable below the required value.

The interposed layer 8 also brings about a desirable reduction in the d.c. resistance of the strength member/inner conductor assembly (when compared with a similarly-dimensioned assembly having a strength member formed completely of steel) and, accordingly, enables the cross-section of the inner conductor to be reduced.

In light weight cables as heretofore constructed, the inner conductor and the strength member form the d.c. power necessary to energise the repeaters required in a submarine cable transmission system, the wall thickness of the inner conductor has been determined by the maximum d.c. voltage drop permitted along the length of cable.

It has been necessary to employ a wall thickness greater than that required for the transmission of the high frequency signals along the system. If the interposed layer 8 is of a metal with a relatively high electrical conductivity, for example, aluminium, the d.c. resistance of the strength member is reduced and this permits the wall thickness of the inner conductor to be reduced thereby reducing the amount of copper required in the manufacture of the inner conductor of the cable.

The cable shown in the drawing has only one interposed layer 8 located between the outer wire layer 7 of the strength member 1 and the centre strand 6. It will be appreciated, however, that if the strength member 1 had more than two wire layers then there could be additional interposed layers. It will also be appreciated that, although the strength member shown in the drawing is incorporated in a submarine cable, it could be applied to any telecommunications cable requiring a strength member contained within the inner conductor.

The invention can also be applied to stranded wire ropes and hawsers.

I claim:

1. A communication cable of co-axial construction having, within the inner conductor of the cable a strength member providing the tensile strength that the cable is required to possess, the strength member comprising at least two layers of helically wound wires, adjacent layers having layers of opposite hand, and at least one layer of a comparatively soft metal interposed between adjacent ones of said first named layers.

2. A communication cable as claimed in claim 1 in which the comparatively soft metal has a high electrical conductivity.

3. A communication cable as claimed in claim 2 in which the comparatively soft metal is selected from the group consisting of aluminium, copper and mild steel.

4. A communication cable as claimed in claim 1 in which the layer of comparatively soft metal comprises at least one tape of such metal.

5. A communication cable as claimed in claim 1 in which the layer of comparatively soft metal comprises at least one helically wound tape of such metal.

6. A communication cable as claimed in claim 1 in which the layer of comparatively soft metal comprises at least one longitudinally applied tape of such metal.

7. A communication cable as claimed in claim 1 in which the layer of comparatively soft metal comprises a plurality of wires of such metal.

8. A communication cable as claimed in claim 1 in which each of the helically wound wires has a cross section normal to its length which is circular.

9. A communication cable as claimed in claim 1 in which each of the helically wound wires has a cross section normal to its length which is key-stone shaped.

* * * * *